United States Patent [19]

Janda et al.

[11] Patent Number: 4,462,097
[45] Date of Patent: Jul. 24, 1984

[54] DYNAMIC VIBRATION ABSORBER FOR A PHONOGRAPH TONE ARM

[75] Inventors: Jiří Janda; Jiří Burdych; Miroslav Lab; Pavel Dlabal, all of Prague, Czechoslovakia

[73] Assignee: TESLA, koncernovy podnik, Prague, Czechoslovakia

[21] Appl. No.: 437,630

[22] Filed: Oct. 29, 1982

[30] Foreign Application Priority Data

Apr. 21, 1982 [CS]  Czechoslovakia ............... 2835-82

[51] Int. Cl.³ .................... G11B 3/10; G11B 3/16; G11B 3/18
[52] U.S. Cl. .................................. 369/248; 369/251; 369/254
[58] Field of Search ............ 369/244, 247, 248, 251, 369/253, 254, 256

[56] References Cited

U.S. PATENT DOCUMENTS

| | | | |
|---|---|---|---|
| 4,079,943 | 3/1978 | Morita et al. | 369/254 |
| 4,101,133 | 7/1978 | Aoki et al. | 369/254 |
| 4,113,265 | 9/1978 | Iyeta | 369/254 |
| 4,143,248 | 3/1979 | Brocksema et al. | 369/256 |
| 4,146,236 | 3/1979 | Tsukamoto | 369/248 |
| 4,251,080 | 2/1981 | Sumachav | 369/248 |

Primary Examiner—Steven L. Stephan

[57] ABSTRACT

A device arranged on the rear part of a phonograph tone arm having a mechanism for the adjustment of the vertical tracking force on the stylus of the tone arm and with a dynamic vibration absorber provided with mechanism for the adjustment of the frequency and damping factor of oscillations, wherein the full weight of the counterweight is engaged in the functioning of the vibration absorber.

7 Claims, 1 Drawing Figure

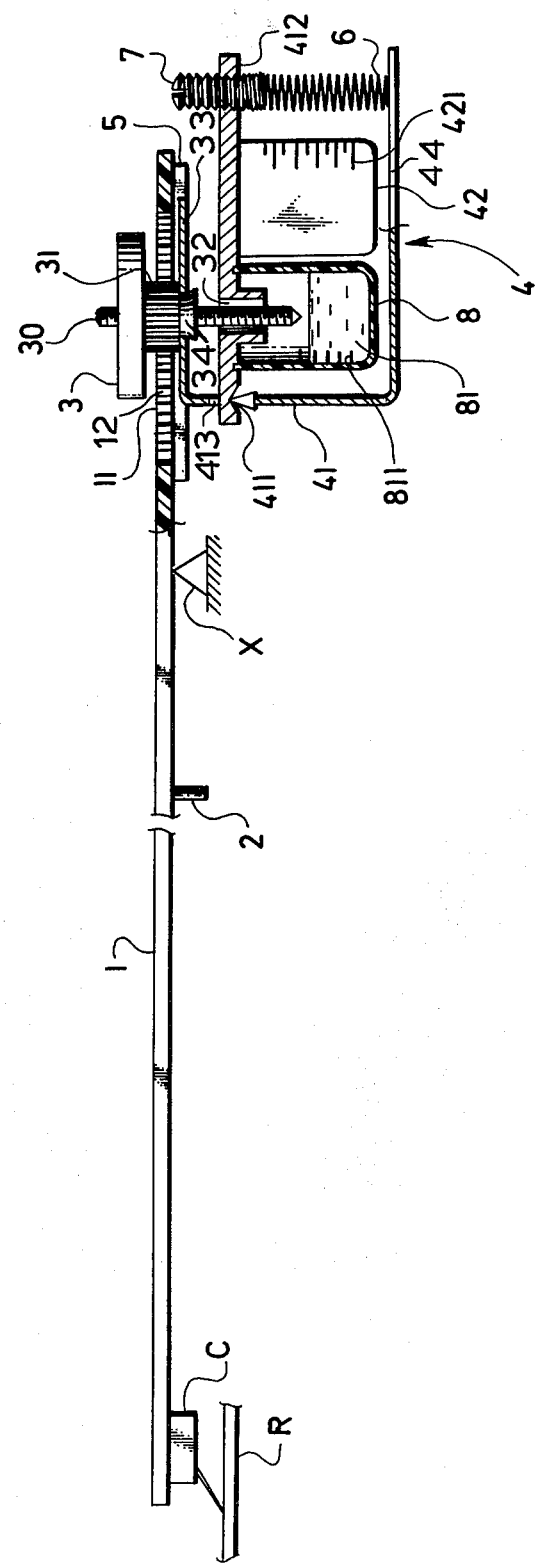

DYNAMIC VIBRATION ABSORBER FOR A PHONOGRAPH TONE ARM

This application is related to the co-assigned patent application of Janda and Hrdlicka, Ser. No. 437,621, filed Oct. 29, 1982.

BACKGROUND OF THE INVENTION

This invention relates to a dynamic vibration absorber for a hi-fi class phonograph tone arm.

Some phonographs of the hi-fi class have a tone arm provided with a dynamic vibration absorber comprising a mechanical resonance circuit with a mechanical yieldable element, for instance a steel spring and some weight means, for instance a part of a counterweight. The function of the dynamic vibration absorber is to reduce the lower resonance peak which results from the joint action of the effective weight of the tone arm and the yieldability of the stylus arm of the built-in stylus holder. A correct functioning of the dynamic vibration absorber is obtained if the major part of the counterweight yieldingly attached to the rear part of the tone arm behind the supporting bearing of the tone arm starts to oscillate at a frequency equal to the undesirable lower resonance peak. As a dynamic vibration absorber oscillates at a counter phase, its operation reduces the amplitude of undesirable oscillations and acts as an anti-resonator of the tone arm. The resistivity of the whole phonograph against shock disturbances in the sub-acoustic range is thereby also improved.

Actually known dynamic vibration absorbers have a major drawback in that they are unable to oscillate equally in all directions as would be required for optimum results with tubular tone arms because of a undesirable resonances of such arms in all directions. Another substantial drawback of known dynamic vibration absorbers is the circumstance that in order to secure the neccessary mechanical stability of the counterweight system, only part of the weight of the counterweight can be arranged yieldingly. The influence of a thus arranged dynamic vibration absorber for the reduction of the lower resonance peak is small since only a small part of the counterweight takes part in the oscillation, whereas in order to suppress the undesirable lower resonance, is desirable that the whole weight of the counterweight shall start to oscillate. Known dynamic vibration absorbers can only tenstively be tuned to the frequency of the lower resonance or tuned after repeated measuring, since there is no suitable aid or arrangement for making it possible directly to adjust the resonance frequency and the damping factor according to specifications from the manufacturer of the respective tone arm and of the built-in stylus holder. If the frequency and the damping are not correctly adjusted, the benefits obtained from the action of the dynamic vibration absorber are substantially reduced.

SUMMARY OF THE INVENTION

It is an object of the present invention to eliminate the above-mentioned drawbacks of the prior art and to provide a dynamic vibration absorber which utilizes substantially the whole weight of the counterweight in its functioning, can be easily adjusted as to the frequency and to the damping factor of its oscillations.

In accordance with the present invention the counter-weight system comprises a support connected with a rotatable adjusting element, the upper horizontal part of the counter-weight system engaging at least one reinforcing or guiding element on the underside of the tone arm, a vertical part of the support being provided with a bearing for one end of an oscillating arm, the body of the counterweight being connected to such arm, in the other end of the oscillating arm is a tuning screw which in turn engages the upper end of a coil compression spring the lower end of which compressively engages the lower horizontal part of the support.

The tuning screw, which is threadedly engaged with a oscillating arm, retains the helical spring in a compressed state due to the load of the oscillating arm. which is the weight of the counterweight as well as the weight of a vibration damping means. The degree of compression of the spring is suitably adjusted by turning the tuning screw.

The counterweight connected to the oscillating arm has a scale mounted on the side thereof which faces the helical pressure spring so that the degree of compression of the spring may be read and calibrated for the adjustment of the resonance frequency of the counterweight.

The vibration damping arrangement comprises a transparent vessel containing a liquid damping medium, the vessel being fastened to the oscillating arm, and a regulating screw for the adjustment of the damping factor connected to the non-oscillating part of a counterweight system and extending downwardly from the rear end bushing of a tone arm through an opening in the oscillating arm into the liquid damping medium in the vessel.

The internal wall of the throughgoing opening in the oscillating arm which receives the regulating screw of a oscillation damping mechanism can extend into the internal part of the vessel, thus forming a retaining space for the damping medium, which space is larger than the volume of the damping medium in the transparent vessel.

The side of the counterweight which faces the tuning screw and the spring is provided with a scale for the adjustment for a damping factor, and a side wall of a transparent vessel containing the liquid damping medium is also provided with a scale for the adjustment of the damping factor by the selected degree of insertion of a regulating scew into the damping medium.

An advantage of the dynamic vibration absorber according to the present invention is that its funtioning in connection with a flat tone arm is limited solely to oscillations in the vertical direction, since the flat tone arm has no yieldability in the horizontal direction, so that no suppresion of a horizontal lower resonance is required. By the reduction of oscillations of the counterweight to those in the vertical direction it is also possible yieldingly to support the counterweight and to allow the whole weight thereof to oscillate; this is practically impossible in cases of oscillations in all directions with actually known dynamic vibration absorbers. A maximum efficiency of the dynamic vibration absorber of the present invention is thus achieved,

DESCRIPTION OF THE DRAWING

The dymanic vibration absorber according to the invention will be described hereafter in connection with the attached drawing showing an examplary embodiment of such vibration absorber.

The sole FIGURE of the drawing is a view partially in side elevation and partially in longitudinal vertical section through a preferred embodiment of vibration absorber in accordance with the invention.

DESCRIPTION OF PREFERRED EMBODIMENT

A flat tone arm 1 is supported on a bearing X which divides the tone arm into a longer front portion and a shorter rear portion. A stylus holder C is monitored near the other end of the front portion of the tone arm, the stylus holder bearing a needle or stylus which engages a phonograph record a fragment of which is shown at R. The front portion of the tone arm is provided with a vertical rest member 2 whereby the tone arm can be selectively retained in a non-functioning or rest position. The rear portion of a tone arm has a longitudionally extending slot 11 one side of which bears a rack gear 12. A pinion 31 mounted in the slot meshes with the rack 12, turning of the pinion by thumb knob 3 causes the pinion and the thumb knob to travel forwardly or rearwardly along the rear portion of the tone arm, depending upon the direction of turning of the pinion. Attached to the bottom of the pinion 31 by a rotatable joint 34 is a C-shaped support 4 for a counterweight and damping system. Such support has an upper horizontal portion 33, a vertical left hand portion 41, and a lower horizontal portion 44, the rotatable joint 34 being located between the pinion 31 and the upper horizontal member 33 of the support. It will be apparent that as the pinion and the thumb knob 3 travel longitudinally of the tone arm, they carry with them a support 4 and the counterweight system and the vibration damping system loaded upon the member 4.

The left hand leg of support 4 has a slot 413 extending therethrough, such slot receiving the left hand end of a generally horizontally disposed arm 412. Such left hand end of arm 412 is supported upon a knife edge bearing 411. The right hand end of the oscillating arm 412 is provided with a vertically disposed tuning screw 7 threaded thereinto and extending downwardly there form. The end of the tuning screw 7 diposed beneath the oscillating arm 412 has threaded engagement with the top of a coil compression spring 6 the lower end of which has compressive engagement with the right hand end of the lower leg 44 of support 4.

Supported upon the oscillating arm 412 is a vessel 8 continuing a colored liquid damping medium 81 such as colored silicon oil. It will be seen that the medium 81 fills only a part of the vessel 8. Also supported upon the oscillating arm 412, to the rear thereof in the embodiment shown, is a counterweight 42. A regulating screw 30 which is monitored in a threaded central bore in the adjusting element 3 extends centrally through a hole 32 in the oscillating arm 42, such hole having a diameter which markedly exceeds that of the regulating scew 30. The lower end of such screw is of conical shape, as shown. The regulating screw 30 can be screwed downwardly so that its lower end dips to a selected degree into the damping medium 81. The degree of displacement of such damping medium by the screw 30 can be detected by a scale 811 disposed on one wall of the vessel 8.

The counterweight 42 is also provided with a scale, such scale 421 facing the spring 6 and the tuning screw 7. Taking the junction between the tuning screw and the spring 6 as an indicator, the degree of compression of the spring 6 can readily be determined upon reference to the scale 421. It is to be understood that if desired these scales 421 and 811 may be placed on other surfaces of their respective members which are adjacent to each other.

Disposed to one side of the slot 11 in the rear portion of the tone arm is a longitudinally extending stiffening and guiding member 5 the edge of which faces the reader in the drawing engaging the confronting edge of part 32 of the frame 4 so that the frame is prevented from turning when the pinion 31 and the adjusting element 3 are rotated. The tuning screw 7 adjusts the resonance frequency of the counterweight 42; the screw 30 adjusts the degree of damping of the vibration damping means; the central disposition of the regulating screw 30 in the pinion 81 and the adjusting element 3, taken with the peripherally symetrical configuration of such screw makes the operation of the regulating screw independent of its rotation with the pinion.

The internal wall of the opening 32 which receives the regulating screw 30 extends into the interior of the vessel 8, thus forming a retaining space for the damping medium 81 of a larger volume than the volume of the damping medium which is in the vessel 8.

The range of the resonance frequency adjustable on the dynamic vibration absorbers chosen according to the effective weight of the tone arm 1 and the yieldability of the stylus arm of different types of the hi-fi class which have to be considered in conjunction with the use of the apparatus of the invention. The frequency range of 7 to 14 Hz has been determined to be the optimum range for practical use. The lowest resonance frequency is determined by the difference of the free length and the compressed length on the coil compression spring 6, the compressed length being that which it has when it is mounted in the apparatus as shown and bears the weight imposed upon the counterweight 42 and the vessel 8 and its contente. The pitch and diameter of helical spring 6 in the compressed state corresponds to the pitch and diameter of the tuning screw 7, which, if need be, can be screwed in or screwed out of the helical spring 6 by turning without changing the height of the counteweight 2. From that it follows that it is possible to eliminate from operation up to three-quarters of the turns of the helical springs by the tuning screw 7, and thus, using scale 421, to adjust the resonance frequency of the apparatus to the required frequency of 7 to 14 Hz.

The transparent vessel 8 with the damping medium 81 is firmly connected with the oscillating arm 412 and thus with the counterweight 42 affixed to the oscillating arm 412 so that they oscillate together in a vertical plane. If the lower end of the regulating screw or the adjustment of the damping factor is out of engagement with the damping medium 81, the damping factor of the vibration absorber is practically 0. In the course of a subsequent submerging of the lower end of the regulating screw 30 into the damping medium 81, at first a slight initial contact between them is established, thereby causing the slightest damping of vertical oscillations of the counterweight 42. In the course of a further submerging of the regulating screw 30 into the damping medium 81, the value of the damping factor can be easily determined according to the position of the lower end of the regulating screw 30 as projected laterally to the respective line on the scale 811.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. An arrangement for the adjustment of the vertical tracking force on a stylus mounted in a phonograph stylus holder disposed on the outer end of a forward, longer end of the phonograph tone arm and for the absorbtion of vibration imposed thereon, said tone arm being mounted upon and supported by a bearing, the tone arm having a shorter part thereof extending rearwardly from the bearing, said shorter rear part of the tone arm being provided with a rotatable adjustment element, a counterweight system disposed below the tone arm and connected to said rotatable adjustment element so as to be moved selectively in opposite directions lengthwise of the rear portion of the tone arm, means for the longitudinal guiding of the counterweight system on the rear part of the tone arm, the counterweight system comprising a support for the counterweight with substantially vertical and horizontal parts, a bearing supporting a first end of a vertically pivotable oscillating arm provided on the vertical part of the support for the counterweight, a coil compression spring disposed with its lower end on the horizontal part of said support and with its upper end on the other, second end of the vertically pivotably oscillating arm, the counterweight being affixed to and supported by said oscillating arm.

2. An arrangement as claimed in claim 1, comprising a vertical tuning screw mounted on said vertically pivoting oscillating arm, said screw having a pitch and a diameter corresponding to those of the coil compression spring in its compressed state, the screw being adapted to be screwed into the top part of the spring, turning of the screw changes the pressure which the spring exerts upon said vertically pivoting oscillating arm.

3. An arrangement according to claim 1, comprising a scale for the adjustment of the resonance frequency of the counterweight, said scale being provided on the side of the counterweight facing the coil compression spring and the lower end of the tuning screw.

4. An arrangement as claimed in claim 1, comprising a vessel containing a damping medium fastened to the vertically pivotable oscillating arm, said arm having an opening therethrough disposed above the vessel, a regulating screw for the adjustment of the damping factor of the arrangement, said regulating screw being adapted for engagement between its lower end and said damping medium in the vessel, the regulating screw passing through said opening and arranged on parts of the counterweight system which do not take place in the oscillations of the counterweight.

5. An arrangement as claimed in claim 4, wherein the internal wall of the opening in the vertically pivoting oscillating arm extends downwardly into the vessel so that the retaining space for the damping medium is larger then the volume of such medium contained in the vessel.

6. An arrangement as claimed in claim 4, wherein the counterweight is provided on the side thereof facing the vessel with a scale for the adjustment of the damping factor.

7. An arrangement in accordance with claim 4, wherein the vertical wall of the vessel is provided with a scale for the adjustment of the damping factor.

* * * * *